United States Patent
Constien

(10) Patent No.: US 9,443,410 B1
(45) Date of Patent: Sep. 13, 2016

(54) PERSONAL SAFETY RESPONSE SYSTEM AND METHOD

(71) Applicant: Anelto, Inc., The Colony, TX (US)

(72) Inventor: Scott D. Constien, Plano, TX (US)

(73) Assignee: ANELTO, INC., Dallas, TX (US)

( * ) Notice: Subject to any disclaimer, the term of this patent is extended or adjusted under 35 U.S.C. 154(b) by 0 days.

(21) Appl. No.: 14/667,970

(22) Filed: Mar. 25, 2015

(51) Int. Cl.
| | |
|---|---|
| G08B 1/08 | (2006.01) |
| G08B 21/04 | (2006.01) |
| H04W 52/02 | (2009.01) |
| H04W 4/12 | (2009.01) |
| H04W 4/22 | (2009.01) |
| G08B 21/02 | (2006.01) |

(52) U.S. Cl.
CPC .......... *G08B 21/0453* (2013.01); *G08B 21/02* (2013.01); *G08B 21/04* (2013.01); *G08B 21/0446* (2013.01); *H04W 4/12* (2013.01); *H04W 4/22* (2013.01); *H04W 52/0209* (2013.01)

(58) Field of Classification Search
CPC .............. G08B 21/02; G08B 21/0202; G08B 21/0205; G08B 21/0211; G08B 21/0227; G08B 21/0233; G08B 21/0258; G08B 21/0275–21/0283; G08B 21/0288; G08B 21/0294; G08B 21/04–21/0453
See application file for complete search history.

(56) References Cited

U.S. PATENT DOCUMENTS

| | | | |
|---|---|---|---|
| 5,265,151 A * | 11/1993 | Goldstein | G01R 29/26 375/222 |
| 6,639,516 B1 * | 10/2003 | Copley | 340/573.4 |
| 6,847,295 B1 * | 1/2005 | Taliaferro et al. | 340/539.13 |
| 8,116,724 B2 | 2/2012 | Peabody | |
| 8,249,547 B1 | 8/2012 | Fellner | |
| 8,548,422 B2 * | 10/2013 | Jenkins | 455/404.1 |
| 8,680,991 B2 * | 3/2014 | Tran | 340/540 |
| 8,826,348 B2 * | 9/2014 | Qin | H04W 52/50 725/82 |
| 2002/0027946 A1 * | 3/2002 | Ozluturk | G06F 13/374 375/130 |
| 2004/0203362 A1 * | 10/2004 | Pattabiraman et al. | 455/41.2 |
| 2005/0136955 A1 * | 6/2005 | Mumick et al. | 455/466 |
| 2013/0244633 A1 * | 9/2013 | Jacobs et al. | 455/415 |
| 2014/0278220 A1 * | 9/2014 | Yuen | 702/150 |
| 2014/0334271 A1 * | 11/2014 | Park et al. | 368/10 |
| 2015/0065095 A1 * | 3/2015 | Seo et al. | 455/412.2 |
| 2016/0049798 A1 * | 2/2016 | Maikawa | H02J 7/00 307/104 |

FOREIGN PATENT DOCUMENTS

| | | | |
|---|---|---|---|
| AU | WO2014124497 A1 | 8/2014 | |
| EP | EP1924069 A1 | 5/2008 | |

* cited by examiner

*Primary Examiner* — Ryan Sherwin
(74) *Attorney, Agent, or Firm* — Andrews Kurth, LLP; Sean S. Wooden

(57) ABSTRACT

A personal safety response system comprises a wearable device to be worn by a user, the wearable device includes a speaker configured for generating audio notification, an exterior visual indicator configured for generating visual notification, a vibrator configured for generating haptic notification, a panic button, a radio frequency transceiver, and a controller configured to recognize a first set of predetermined conditions, and transmit a notification to a base telephone. The base telephone includes a radio frequency transceiver configured for two-way communication with the wearable device, and transmit and receive data over the telecommunication network and Internet, a memory, a processor configured to recognize a second set of predetermined conditions, and transmit a notification to the wearable device, a user input device configured to receive user input, and a display screen configured to display information associated with the notification transmitted to the wearable device.

36 Claims, 10 Drawing Sheets

PERSONAL SAFETY RESPONSE SYSTEM AND METHOD

FIELD

The present disclosure relates to a personal communication device, and in particular to a system and method for personal safety and emergency response.

BACKGROUND

As the life expectancy of the U.S. population continues to increase, the number of active and at risk geriatric trauma patients will continue to grow. According to the Centers for Disease Control and Prevention, each year millions of adults aged 65 and older fall. Falls can cause moderate to severe injuries, such as hip fractures and head traumas, and can increase the risk of early death. In 2013, 2.5 million nonfatal falls among older adults were treated in emergency departments and more than 734,000 of these patients were hospitalized.

Research supports the common sense notion that getting prompt help makes surviving an emergency more likely. The ability to get help also boosts the odds that a senior will continue to live independently. The longer a person had to spend injured and without help, the greater the likelihood he/she will be discharged into supportive care. For elderly people who live alone, becoming incapacitated and unable to get help is a common event, which usually marks the end to their ability to live independently. According to the New England Journal of Medicine, after a fall or other emergency, 90% of seniors who get help within one hour will continue independent living, but after 12 hours without help only 10% of people will continue to live at home. There is a only a 6% to 9% early mortality rate from heart attack for those who survive long enough to reach the hospital. Therefore, getting to the hospital quickly after a fall, heart attack, or other emergencies is the goal.

DETAILED DESCRIPTION

Figure 1:
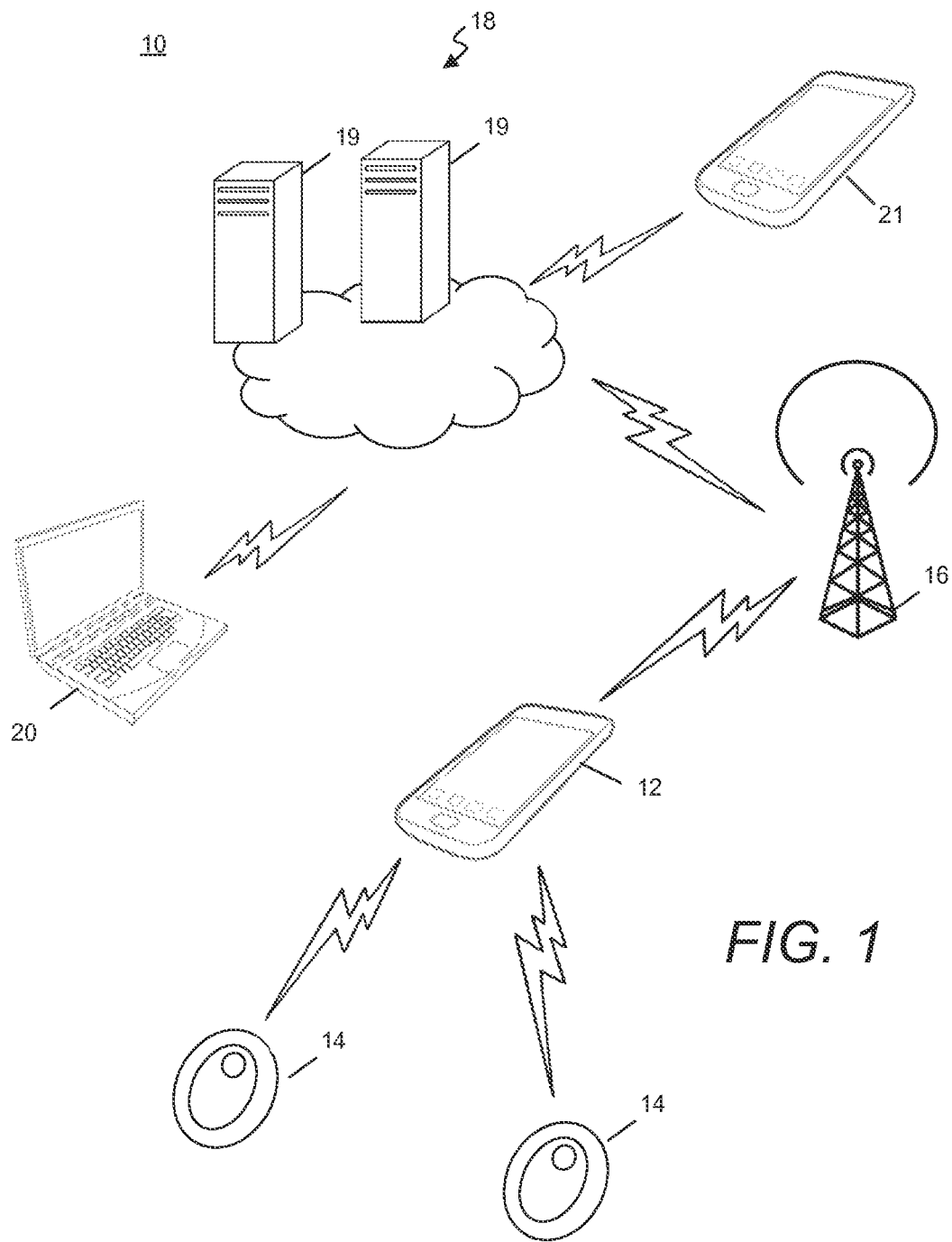
FIG. 1 is a simplified block diagram of an exemplary personal safety system according to the present disclosure.

FIG. 1 is a simplified block diagram of an exemplary personal safety system 10 according to the present disclosure. The personal safety system 10 includes a base telephone 12 monitoring and in communication with a plurality of wearable devices 14. The base telephone 12 is preferably a specialized mobile telephone that is capable of communicating (transmitting and receiving data) with a base station or eNodeB 16 (also known as a cell tower). The base station 16 enables the base telephone 12 to have connectivity with remote monitors and emergency centers 18 (illustrated as servers 19, laptop computer 20, and mobile telephone 21). The remote monitor may be a monitoring service, friends, and/or family members.

The base telephone 12 is preferably a simplified mobile telephone that has a screen for displaying notifications and information, and dedicated function buttons for receiving user input. The display screen also may be touch-sensitive to receive user input and commands. The base telephone may incorporate functionality typically found in mobile telephones and smartphones. The base telephone 12 may be programmable to store, in its memory, a number of telephone numbers of family members, friends, caregivers, and doctors that can be automatically dialed when needed or commanded by the user. The base telephone 12 may also be implemented by a conventional mobile telephone equipped with a specialized personal safety app that encompasses the functions described herein. Examples of the base telephone 12 include a cellular phone, a smart phone, a session initiation protocol (SIP) phone, a laptop, a personal digital assistant (PDA), or any other device equipped with a display and a user interface capable of communicating with the telecommunication network and/or the Internet. The base telephone 12 is a 2G/3G/4G, CDMA, and/or LTE-capable device. The base telephone 12 may also be referred to by those skilled in the art as a mobile station, a subscriber station, a mobile unit, a subscriber unit, a wireless unit, a remote unit, a mobile device, a wireless device, a wireless communications device, a mobile subscriber station, a mobile terminal, a wireless terminal, a remote terminal, a handset, a mobile client, a client, or some other suitable terminology.

Alternatively, the base telephone 12 may be implemented by a wireless telephone handset that communicates with a landline base. The base telephone 12 may also be a combination communication device that can communicate via both wireless and landline telecommunication pathways.

The wearable device 14 is preferably worn by the user so that it may monitor the user's wellbeing and status. It can take the form of a ring, bracelet, pendant, brooch, belt buckle, etc. depending on the user's preference. Certain embodiments of the wearable device may further implement the ability to take vital measurements of the user, such as temperature, pulse rate, blood oxygen content, etc. The wearable device 14 preferably includes a visual indicator such as an LED (preferably multi-colored LED to provide status information) and is capable of providing audio notification (pre-recorded sounds and messages) and haptic feedback to the user. Other forms of audio/visual/haptic feedback are contemplated herein.

The base telephone 12 and wearable device 14 are designed to carry on two-way communication and work together in close proximity. Ideally, the user would wear the wearable device 14 on her person, such as worn around her wrist like a bracelet or watch, for example. The base telephone 12 is preferably carried in the user's pocket, purse, clipped-on to a belt, or otherwise positioned nearby. The two devices function together to monitor the user's status, provide audio/visual/haptic notification to the user via the wearable device, and to provide additional information on the display screen of the base telephone to the user. The base telephone may further incorporate other exterior visual indicators, such as multi-colored LEDs. The base telephone is further used to transmit notification to remote monitors, family members, caregivers, and doctors 18, for example, via the telecommunication network and/or the Internet.

Figure 2:
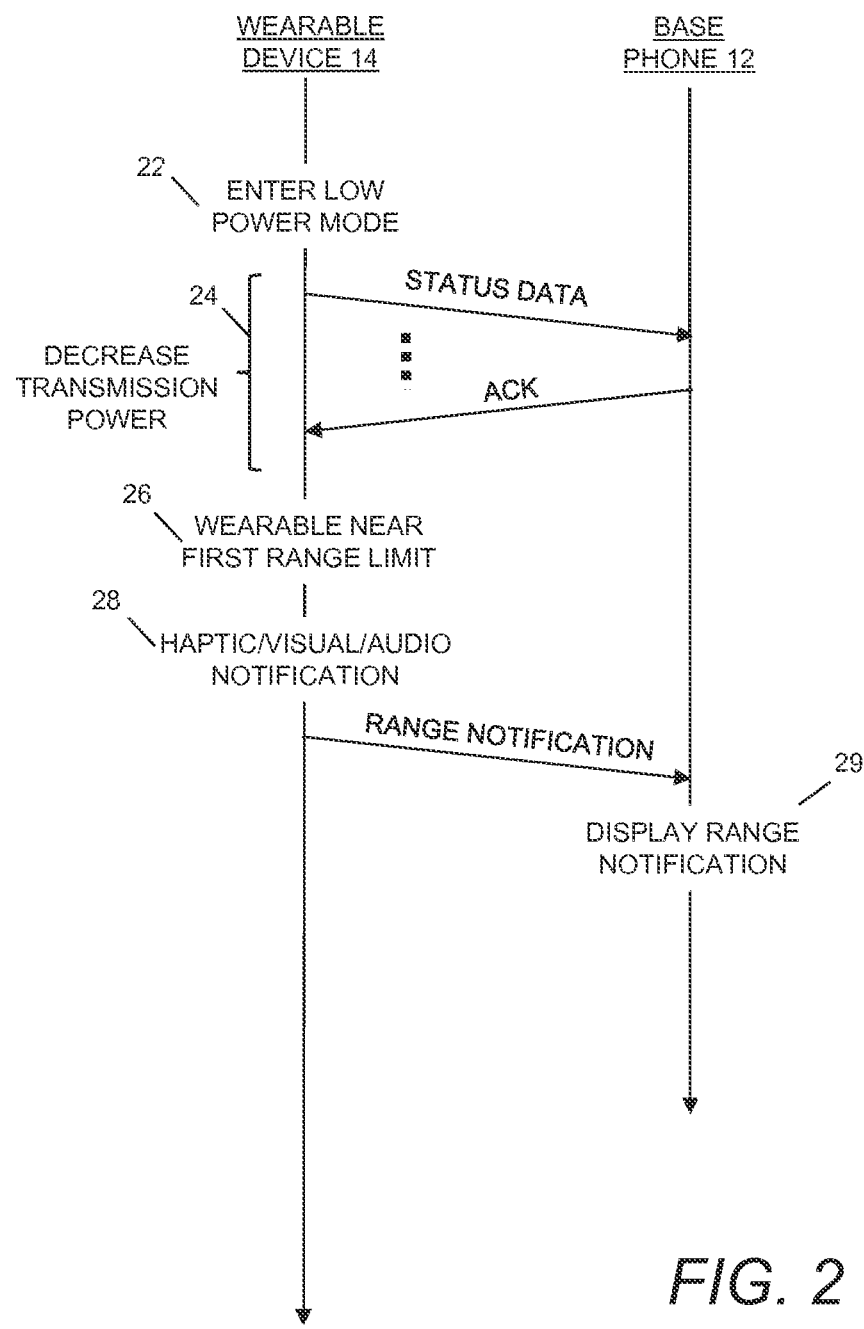
FIG. 2 is a simplified message flow diagram of an exemplary process for range notification according to the present disclosure.

FIG. 2 is a simplified message flow diagram of an exemplary process for range notification according to the present disclosure. Because the base telephone 12 and wearable device 14 are designed to work in tandem, the system 10 functions to ensure that the distance between the two devices does not exceed a predetermined threshold. The wearable device 14 is typically operating in the low power mode (indicated by numeral 22) with the assumption that the wearable device 14 is within a nominal range of the base telephone 12. Operating in the low power mode saves power usage and prolongs the operating time for the wearable device and the base telephone. The base telephone 12 continually monitors transmissions from the wearable device 14. Periodically, the wearable device 14 transmits a data packet or message to the base telephone 12. The data message may include status data indicative of current system status, user status and measurements, and other information. The wearable device 14 may use decreasing power to transmit the data packet/message to the base telephone 12 until bit errors and lost data packets occur to determine the minimum signal power needed for data transmission between the wearable device and the base telephone (indicated by numeral 24). When data transmission errors occur, the wearable device 14 increases the transmission power until the transmission errors are minimized or eliminated. In this way, the wearable device 14 may modulate power usage for power savings purposes. The wearable device 14 further determines when the distance between the devices is near a limit (indicated by numeral 26). The user is notified when the distance between the base telephone and the wearable device exceeds or approached the limit (indicated by numeral 28) by audio/visual/haptic means. Because the base telephone is used to display messages and other data on its screen, the system reminds the user to keep the base telephone close to the user for easy access. The base telephone also displays the range notification on its screen (indicated by numeral 29).

Figure 3:
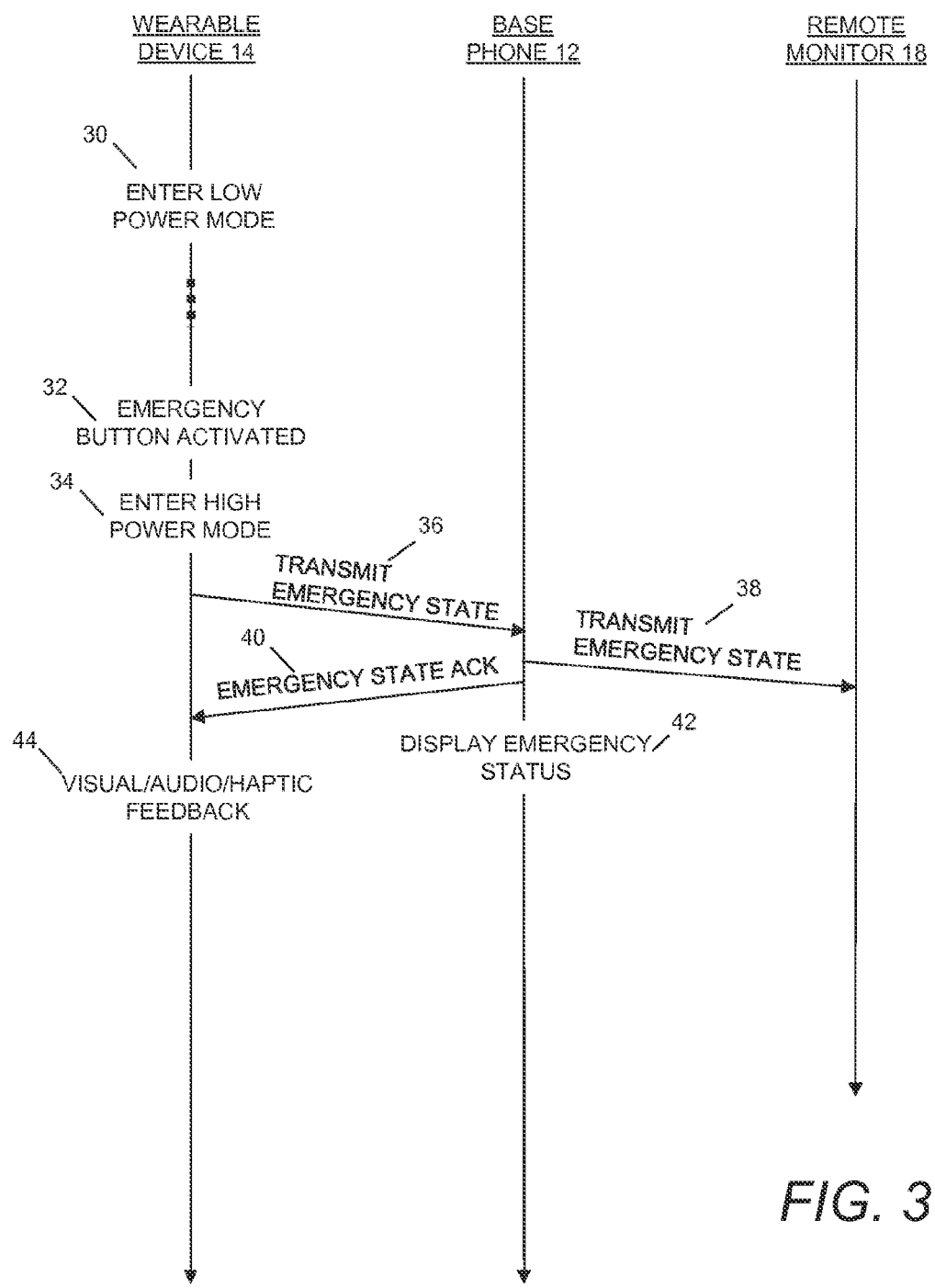
FIG. 3 is a simplified message flow diagram of an exemplary process for emergency response and notification according to the present disclosure.

FIG. 3 is a simplified message flow diagram of an exemplary process for emergency response and notification according to the present disclosure. The wearable device 14 is typically operating in the low power mode (indicated by numeral 30) with the assumption that the wearable device 14 is within a nominal range of the base telephone 12. As described above, the range and operating transmission power of the wearable and/or base telephone is continually monitored and modulated in order to save power consumption. The wearable device 14 determines that a conspicuously marked emergency/panic button has been activated or pushed (indicated by numeral 32). The wearable device 14 preferably includes a dedicated button that may be used to initiate an emergency operating status. In response, the wearable device enters high power mode (indicated by numeral 34). The wearable device may optionally provide audio/visual/haptic feedback when the user pushes the emergency button to indicate that it has received the emergency input from the user. The wearable device also sends an appropriate notification to the base telephone (indicated by numeral 36), which in turn transmits the emergency status to a remote monitor (indicated by numeral 38). The base telephone 12 sends back an acknowledgement message to the wearable device (indicated by numeral 40). The display screen on the base telephone also reflects the emergency status (indicated by numeral 42). The wearable device may indicate to the user via audio/visual/haptic feedback that the emergency status has now been transmitted remotely and that help will be forthcoming.

In addition to initiation by pushing the emergency button, the foregoing emergency process may also be automatically activated when the wearable device detects a fall (by its internal accelerometer), a weak or irregular pulse (by its internal heart rate monitor), low blood oxygen level (by its internal pulse oximeter), and any other less than optimal condition of the user.

Figure 4:
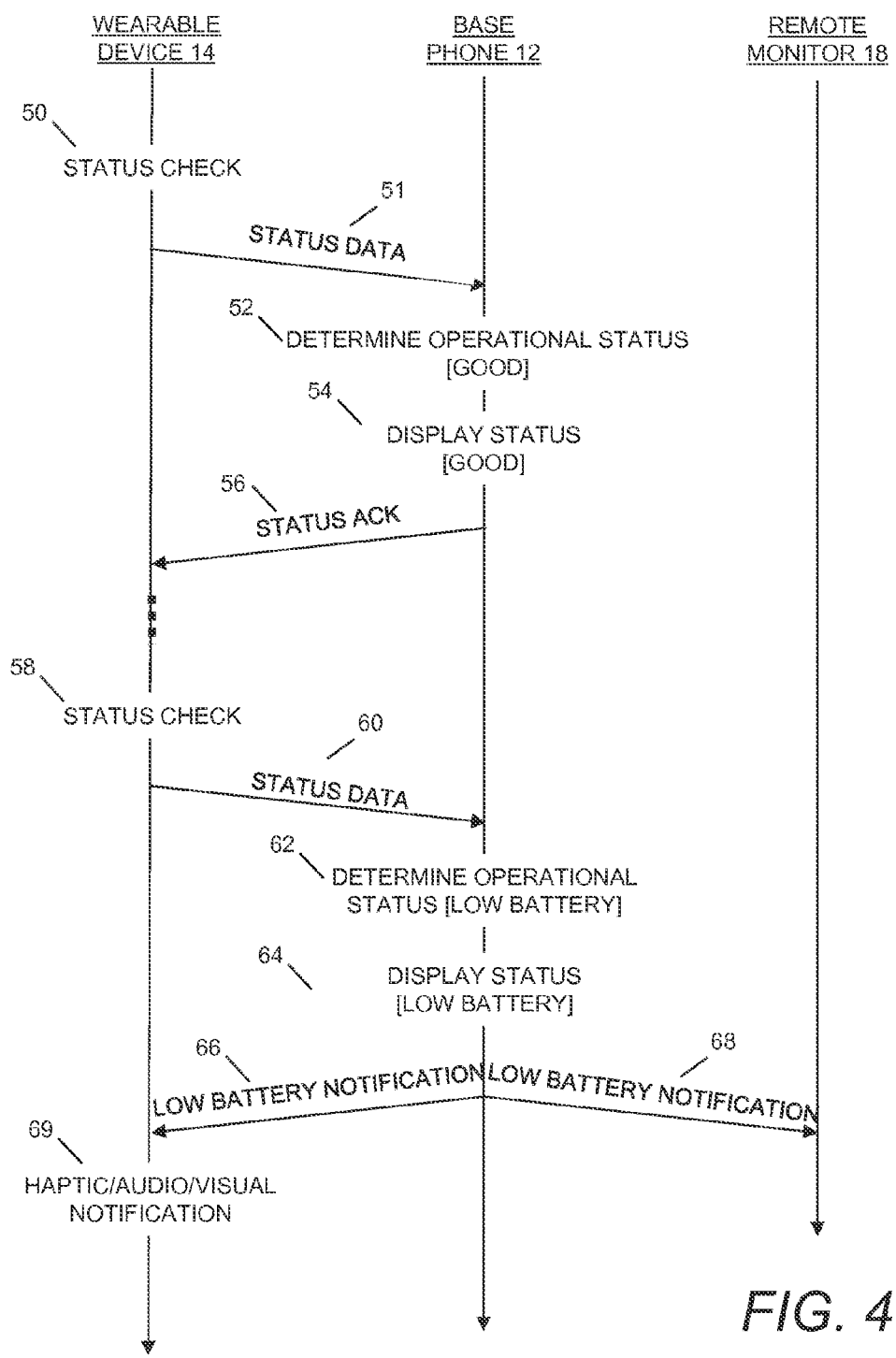
FIG. 4 is a simplified message flow diagram of an exemplary process for low battery status notification according to the present disclosure.

FIG. 4 is a simplified message flow diagram of an exemplary process for low battery status notification according to the present disclosure. The wearable device 14 periodically performs a status check and sends status data to the base telephone (indicated by numerals 50 and 51). As a part of the status check, the wearable device may perform basic diagnostics on its operating parameters such as battery level, etc. The base telephone receives the status data and determines that the wearable is in good operating status (indicated by numeral 52), and may reflect this status on its display and/or other exterior visual indicators (indicated by numeral 54). The base telephone then sends back to the wearable device an acknowledgement message (indicated by numeral 56).

As indicated by numerals 58 and 60, the wearable device 14 performs another status check and sends its status data to the base telephone 12. The base telephone receives the status data and determines that the wearable device is experiencing a low battery condition (indicated by numeral 62). The base telephone displays this low battery status on its screen (indicated by numeral 64). The base telephone further sends a low battery notification message to the wearable device as well as the remote monitor (indicated by numerals 66 and 68). Alternatively, the low battery notification may be sent to the remote monitor after a predetermined time has elapsed or the battery level drops below an even lower threshold. The wearable device provides audio/visual/haptic feedback to the user (indicated by numeral 69), so that the user may view the screen on the base telephone and recognize the low battery status. The wearable device may also include an exterior visual indicator such as a lit or blinking red LED to convey to the user the low battery status. The user may then recharge or replace the battery in the wearable device.

Figure 5:
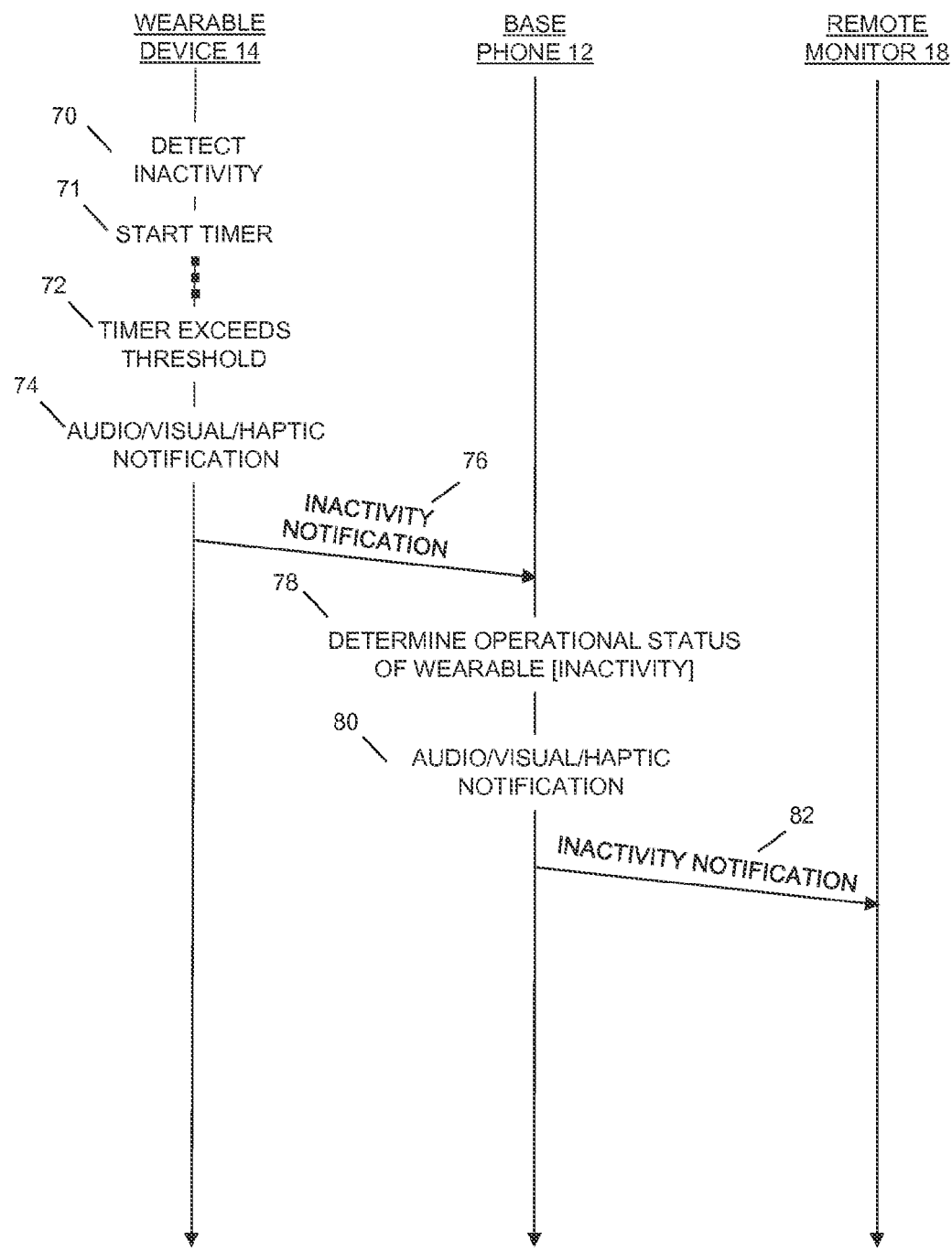
FIG. 5 is a simplified message flow diagram of an exemplary process for inactivity status notification according to the present disclosure.

FIG. 5 is a simplified message flow diagram of an exemplary process for inactivity status notification according to the present disclosure. When a user is inactive for a prolonged period during a time when activity and movement are expected, there may be an anomaly or adverse condition that requires attention. The wearable device 14 detects that the user is inactive and starts a timer (indicated by numerals 70 and 71). The inactivity detection may be measured by an accelerometer, for example. The recognition of inactivity may initiate measuring the user's pulse rate and blood oxygen content, and making the measurements available to the base telephone for analysis and/or remote transmission. The timer is restarted when the wearable device detects movement in the user. If the timer eventually exceeds a predetermined limit or threshold, then the wearable device generates an audio/visual/haptic notification (indicated by numeral 72). The purpose of the notification may be to wake up the user, who may be a worker that may have dozed off on the job, or a user that may have become unconscious. The inactivity status is transmitted by the wearable device to the base telephone (indicated by numeral 76). The base telephone determines from the notification that the user is inactive, and may generate its own audio/visual/haptic notification (indicated by numerals 78 and 80). Further, the base telephone may send an inactivity notification to the remote monitor (indicated by numeral 82).

Figure 6:
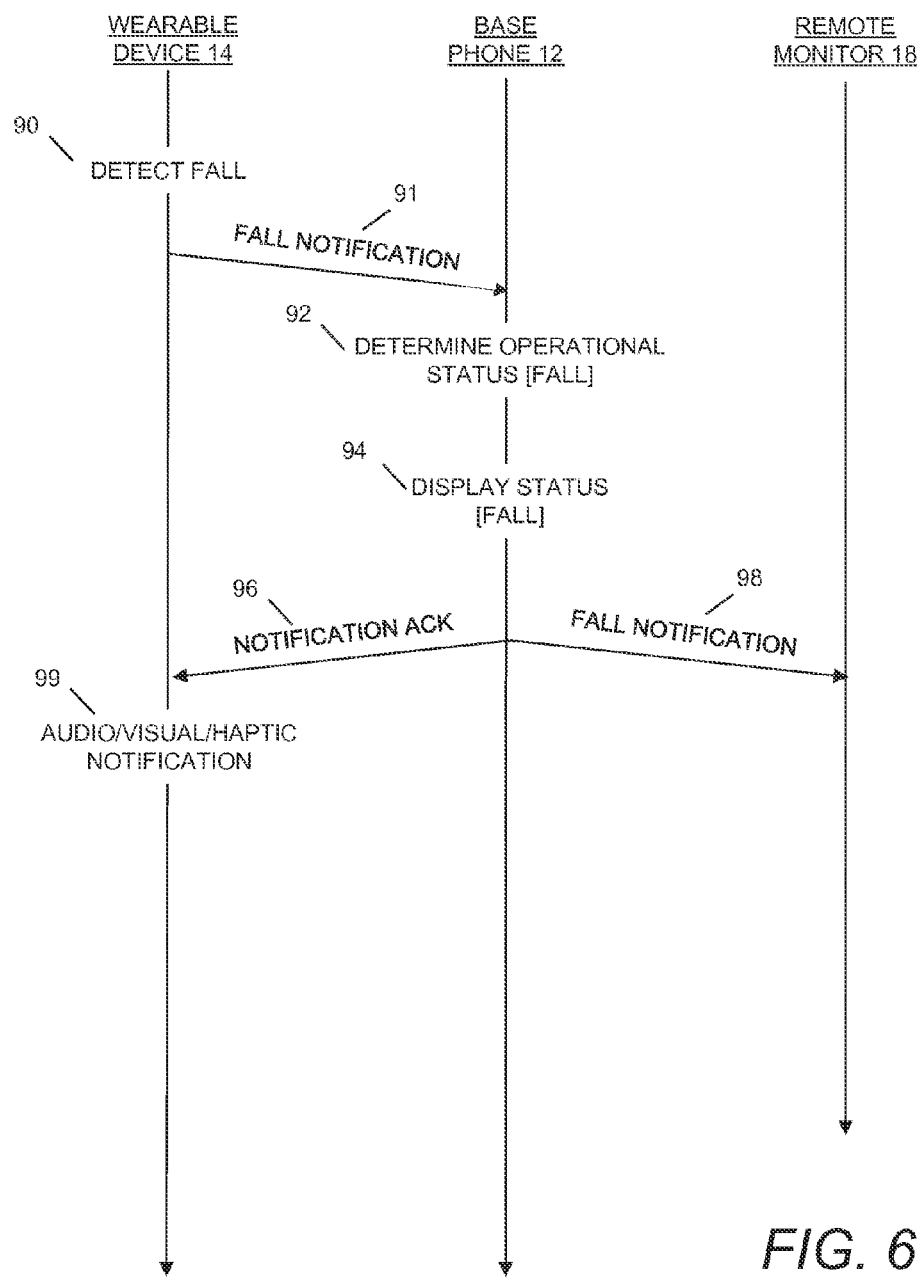
FIG. 6 is a simplified message flow diagram of an exemplary process for fall notification according to the present disclosure.

FIG. 6 is a simplified message flow diagram of an exemplary process for fall notification according to the present disclosure. An accelerometer in the wearable device 14 may detect a fall or another trauma experienced by the user (indicated by numeral 90). The wearable device immediately sends a fall notification to the base telephone (indicated by numeral 91). The base telephone 12 receives the fall notification message and is informed that the user may have experienced a fall, and may display this as a status on its screen (indicated by numerals 92 and 94). The base telephone sends an acknowledgement message back to the wearable device, and additionally sends a fall notification to the remote monitor (indicated by numerals 96 and 98). The wearable device may generate an audio/visual/haptic notification to let the user know that help is on the way (indicated by numeral 99).

Figure 7:
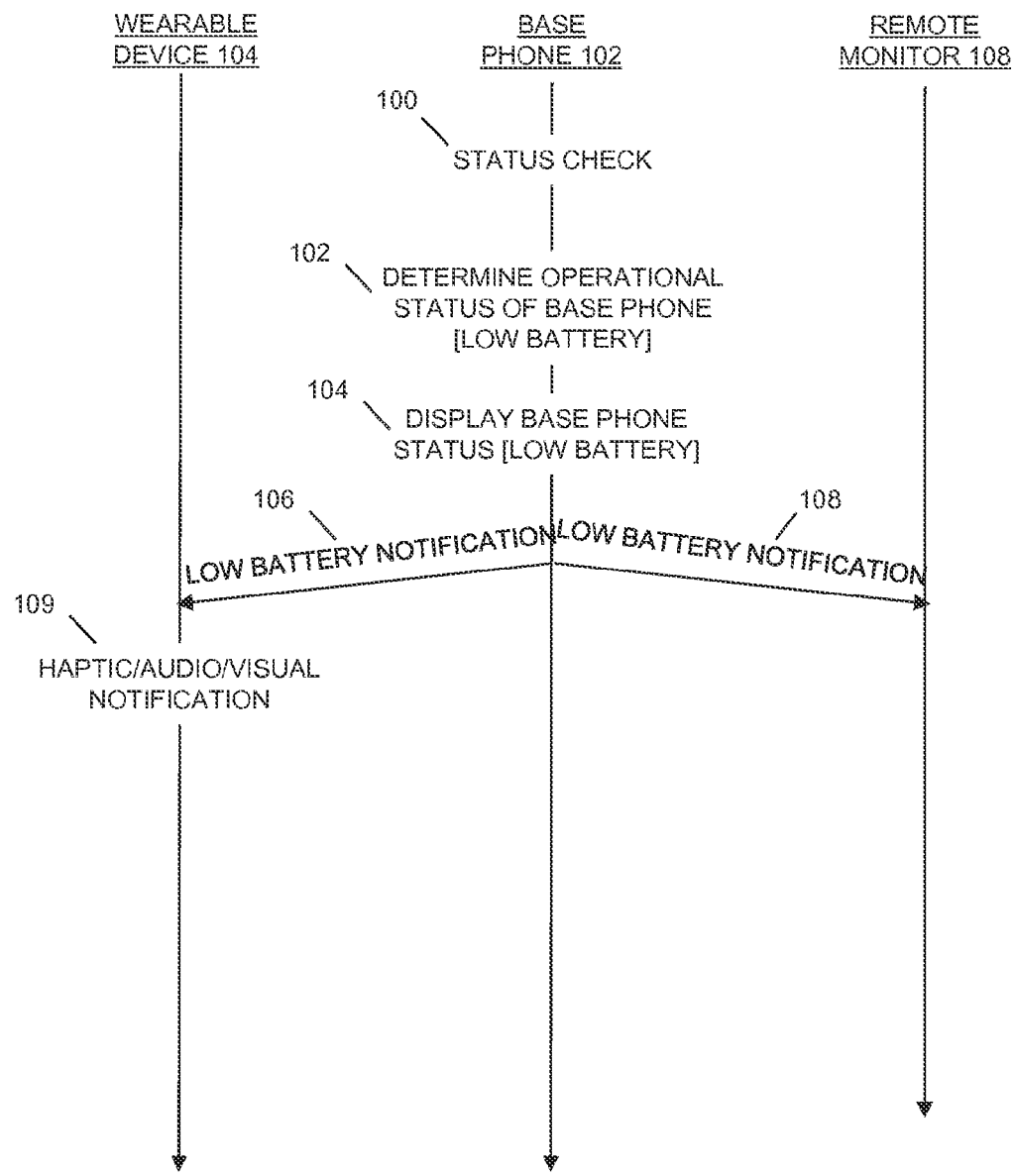
FIG. 7 is a simplified message flow diagram of an exemplary process for base telephone low battery notification according to the present disclosure.

FIG. 7 is a simplified message flow diagram of an exemplary process for base telephone low battery notification according to the present disclosure. The base telephone may perform a status check of its own operational parameters (indicated by numeral 100). As a part of its status check, it determines that its own battery charge is below a certain threshold (indicated by numeral 102). In response, the base telephone displays the low battery status on its screen or via an exterior visual indicator (indicated by numeral 104). The base telephone further sends a low battery notification to the wearable device to notify the user, and another low battery notification to the remote monitor (indicated by numerals 106 and 108). In response, the wearable device generates an audio/visual/haptic notification to notify the user of a condition that needs attention.

Figure 8:
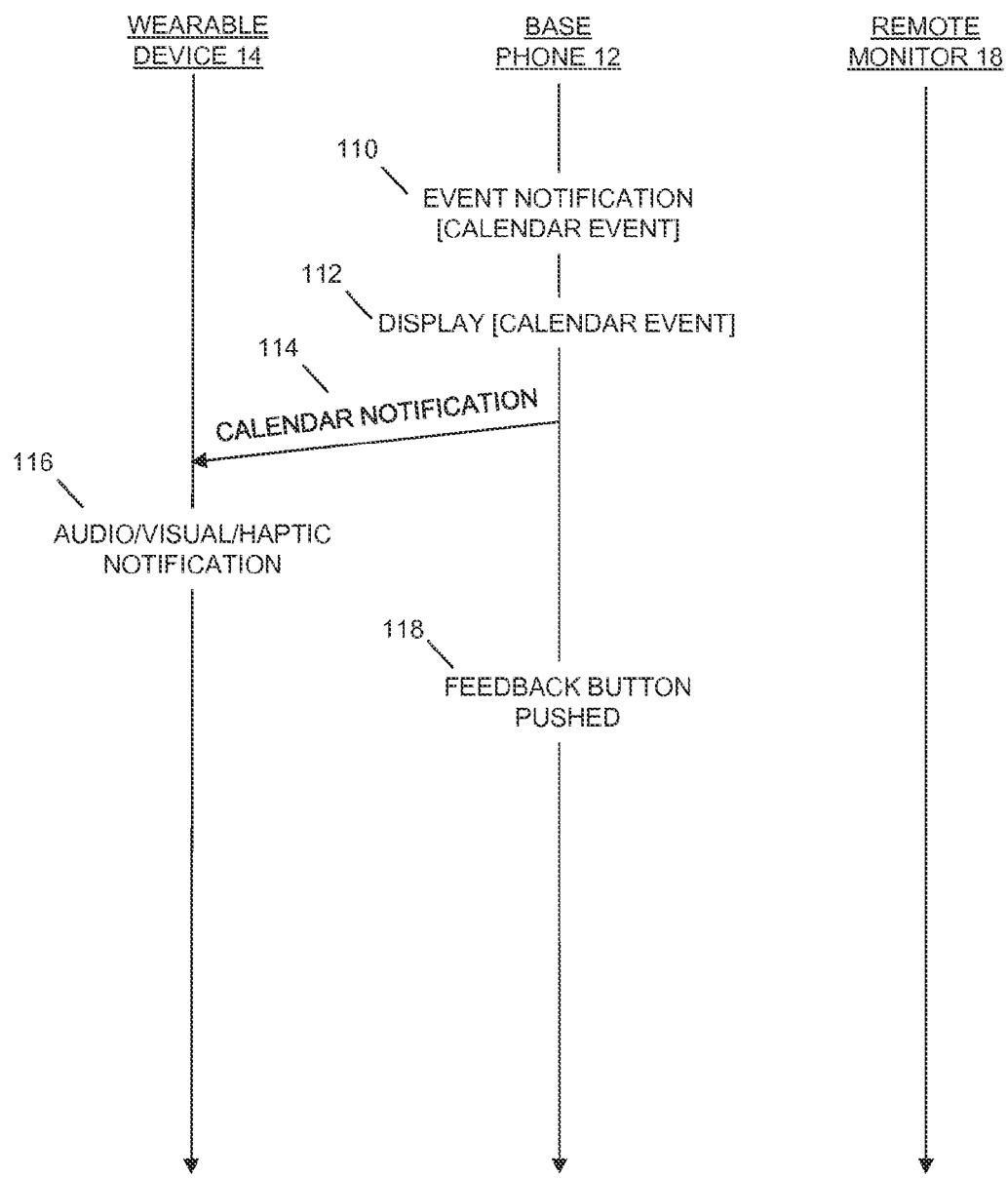
FIG. 8 is a simplified message flow diagram of an exemplary process for calendar event notification according to the present disclosure.

FIG. 8 is a simplified message flow diagram of an exemplary process for calendar event notification according to the present disclosure. The base telephone may store calendar events such as doctors' appointments, medication reminders, prescription medicine refills, and social engagements in its memory. Alternatively, a remote server 19 may store these calendar events and send a notification to the base telephone 12 at the appropriate reminder time. The base telephone generates a calendar event notification when a stored event has an associated scheduled reminder (indicated by numeral 110). The base telephone displays information related to the calendar event on its screen and sends a notification to the wearable device (indicated by numerals 112 and 114). The wearable device generates an audio/visual/haptic notification to alert the user (indicated by numeral 116), so that the user may view details of the calendar event on the screen of the base telephone 12. The user may optionally push a feedback/acknowledgement button on the base telephone 12 to indicate acknowledgement of receiving the calendar event notification (indicated by numeral 118). The base telephone may transmit the acknowledgement to the remote server so that the remote monitor knows that the user has received the calendar event notification. The base telephone 12 may be customized to automatically initiate the text-to-speech function and audibly announce the calendar event. For example, the base telephone 12 may announce, "Doctor appointment scheduled today at nine-thirty," along with a message from a caregiver recorded when the appointment was entered into the system, "Mom, I will pick you up today at your house at nine. We can go to lunch after your appointment."

The base telephone 12 is also capable of providing other forms of notification to the wearable device 14 in a similar manner. For example, an incoming call on the base telephone may cause it to ring, as well as send a call notification to the wearable device. The wearable device may in turn provide audio/visual/haptic notification to alert the user. The base telephone may similarly include the capability to recognize and provide notification for door bells, and other situations where the user's attention is needed.

Figure 9:
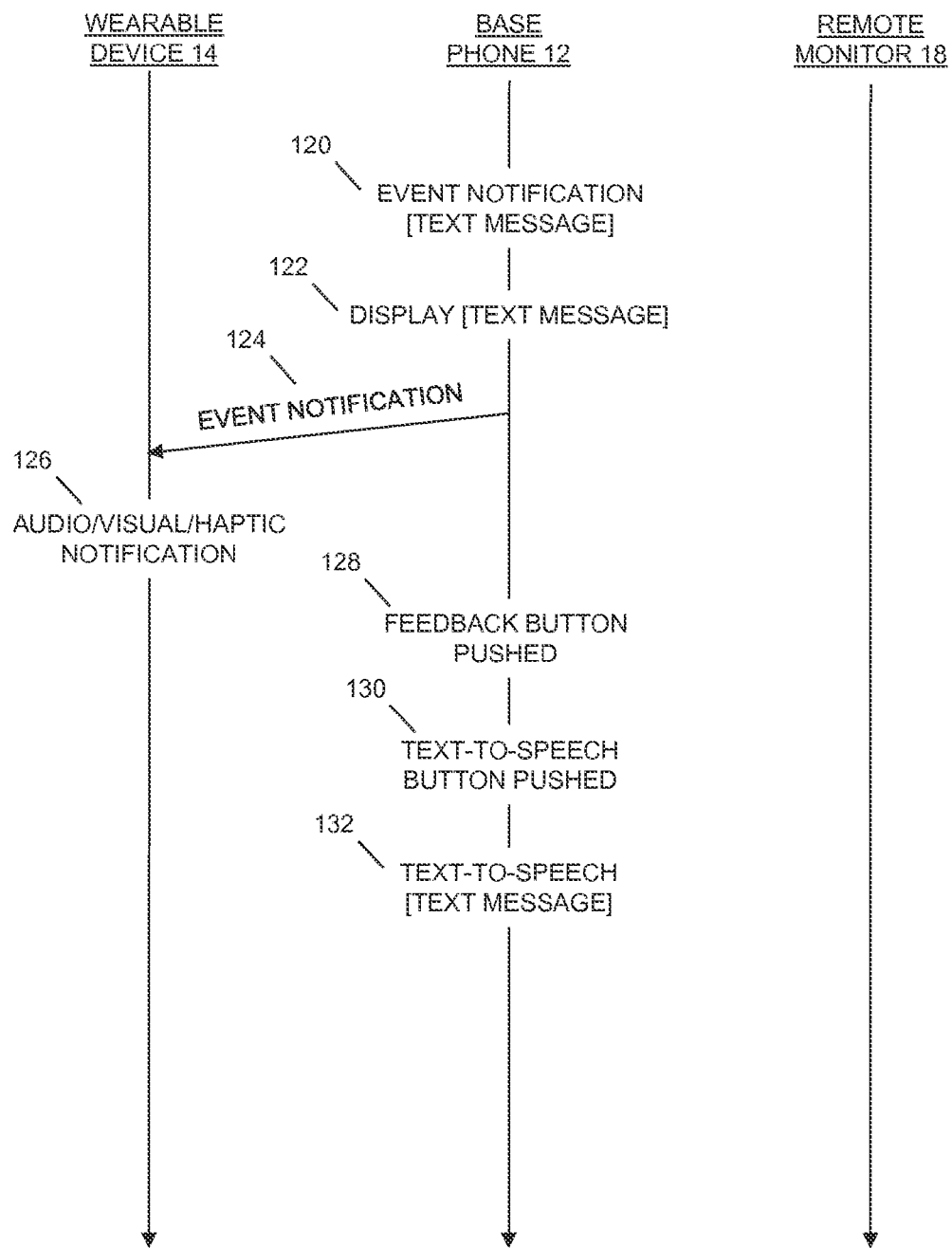
FIG. 9 a simplified message flow diagram of an exemplary process for text message notification according to the present disclosure.

FIG. 9 a simplified message flow diagram of an exemplary process for text message notification according to the present disclosure. The base telephone may receive a text message, audio message, multimedia message, or another form of text communication intended for the user. In response, the base telephone generates a text message event notification and displays the text message on its screen (indicated by numerals 120 and 122). The base telephone then sends a notification message to the wearable device (indicated by numeral 124). The wearable device generates an audio/visual/haptic notification to alert the user (indicated by numeral 126), so that the user may view the text message on the screen of the base telephone. The user may optionally push a feedback or acknowledgement button on the base telephone to indicate acknowledgement of receiving the calendar event notification (indicated by numeral 128). The base telephone may transmit the acknowledgement to the remote server so that the remote monitor knows that the user has heard/seen the message. In addition, the user may instruct the base telephone to verbalize the text message with its text-to-speech functionality (indicated by numerals 130 and 132). The user may push a dedicated text-to-speech button or enter the command via another form of user interface.

It should be noted that in embodiments where a single base telephone is used to monitor and communicate with multiple wearable devices, the data communication to and from the wearable device include unique identifiers that are associated with particular users. In this way, the base telephone and the wearable devices can carry on two-way communications in a broadcast manner and in a targeted way specific to a particular user.

Figure 10:
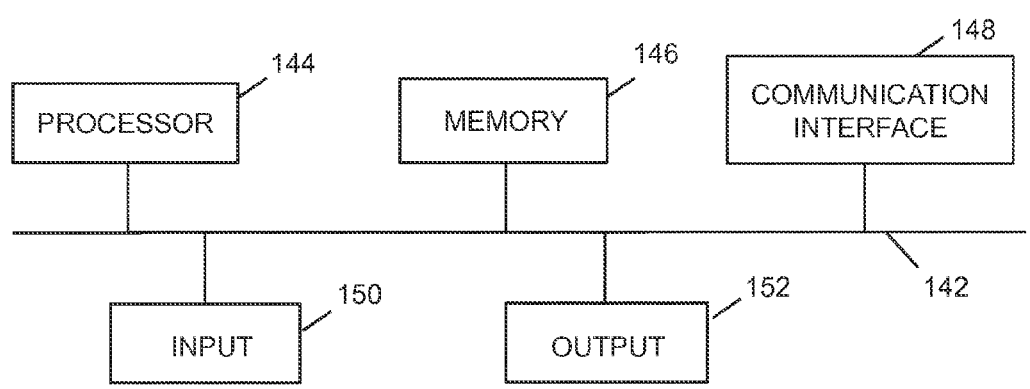
FIG. 10 is a simplified block diagram of an exemplary base telephone and/or wearable device according to the present disclosure.

FIG. 10 is a simplified block diagram of an exemplary specialized device 140 that may implement the base telephone 12 and/or the wearable device 14 for carrying out the afore-described methods according to the present disclosure. The device 140 may include a bus 142 or electrical pathway that interconnects a processor 144, a memory 146, a communication interface 148, an input device 150, and an output device 152. The bus 142 enables communication among the various components of device 140. The processor 144 may include one or more processing units or microprocessors that interpret and execute coded instructions. In other implementations, the processor 144 may be implemented by or include one or more application-specific integrated circuits (ASICs), field programmable gate arrays (FPGAs), or the like.

The memory 146 may include a random access memory (RAM) or another type of dynamic storage device that stores information and instructions for execution by the processor 104. The memory 146 may also include a read-only memory (ROM) or another type of static storage device that stores static information and instructions for the processor 144. The memory 146 may further include other types of magnetic or optical recording medium and its corresponding drive for storing information and/or instructions. As used herein, the term "memory" is broadly to include registers, buffers, and other data constructs configured to hold data.

The communication interface 148 may include protocol stacks for processing data transmitted via a data protocol now know or to be developed. The communication interface 148 may include multi-band antenna and transceiver devices that enables the device 140 to communicate via across wide bands of radio frequency with other devices and/or systems. The communication interface 138 may further include interfaces, ports, or connectors to other devices.

The input 150 may include one or more devices that permit a user to enter commands and data into the device 140, such as button(s), a keypad, a keyboard, a stylus, a touch-sensitive pad or screen, a microphone, one or more biometric mechanisms, and the like. The input may further include a microphone in the case of the base telephone. The output 152 may include one or more devices that outputs information to the operator, such as LED(s), a display screen, a speaker, etc.

As described herein, the device 140 may perform certain operations in response to the processor 144 executing custom and specialized software instructions contained in a computer-readable medium, such as memory 146. A computer-readable medium may be defined as a physical or logical memory device. A logical memory device may include memory space within a single physical memory device or spread across multiple physical memory devices. The custom software instructions may be downloaded from the Internet, read into memory 146 from another computer-readable medium, or from another device via a communication interface 148. The specialized software instructions contained in the memory 146 may cause the processor 144 to perform specialized processes described herein. Alternatively, hardwired circuitry may be used in place of or in combination with software instructions to implement processes described herein. Thus, implementations described herein are not limited to any specifically required combination of hardware circuitry and software.

Working in tandem in this way, the wearable device can remain a simple and small device that can be easily worn by the user. The base telephone can push notification to the wearable device, and provide information on its display screen. The wearable device incorporates simple devices that can provide audio/visual/haptic notification to the user, and prompts the user to look on the base telephone's display for information on the triggering event, such as an incoming call or text message, low battery, out-of-range, scheduled appointment, etc.

As described above, the wearable device 14 may further incorporate specialized instruments such as accelerometer, oximeter, thermometer, and other devices that can provide more specific measurement data concerning the wellbeing of the user.

In this disclosure, the term "device" may be used to refer a specialized physical circuit or collection of hardware components, a specially-programmed logical code module, functionality, and/or a combination of hardware and software entities.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A personal safety response system, comprising:
   a wearable device to be worn by a user, the wearable device including:
   a speaker configured for generating audio notification;
   an exterior visual indicator configured for generating visual notification;
   a vibrator configured for generating haptic notification;
   a panic button;
   an antenna;
   a radio frequency transceiver; and
   a controller configured to recognize a first set of predetermined conditions, and transmit a first notification to a base telephone;
   the base telephone including:
   an antenna;
   a radio frequency transceiver configured for two-way communication with the wearable device, the radio frequency transceiver of the base telephone configured to transmit and receive data over a telecommunication network and Internet, wherein the radio frequency transceiver of the wearable device initially transmits data to the base telephone in a low power mode to conserve power usage, decreases power from the low power mode until bit errors and lost data packets occur, and then increases power until the transmitted data is received by the base telephone with minimal errors;
   a memory;
   a processor configured to recognize a second set of predetermined conditions, and transmit a second notification to the wearable device;
   a user input device configured to receive user input; and
   a text-to-speech function and a speaker configured to announce the second notification.

2. The system of claim 1, wherein the base telephone further comprises a visual indicator configured to display information associated with the second notification transmitted to the wearable device.

3. The system of claim 1, wherein the controller of the wearable device is configured to determine when the wearable device and the base telephone are separated by a distance near or greater than a predetermined limit for status and message alerts, and to generate an audio/visual/haptic notification to alert the user.

4. The system of claim 3, the controller further configured to record the time and date when the wearable device first became separated from the telephone by a distance near the predetermined limit, when the wearable device returned to less than the predetermined limit and the duration the wearable device was separated from the telephone by a distance near or greater than a predetermined limit for later analysis.

5. The system of claim 1, wherein the wearable device is configured to perform an operational status check and transmit the operational status to the base telephone.

6. The system of claim 1, wherein the wearable device is configured to determine a battery low status and transmit the battery low status to the base telephone.

7. The system of claim 1, wherein the base telephone is configured to determine a battery low status and transmit the battery low status to the wearable device for notification to the user.

8. The system of claim 1, wherein the wearable device is configured to recognize the panic button being activated, generate and transmit an emergency state notification to the base telephone, and the base telephone is configured to transmit an emergency state notification to a remote monitor.

9. The system of claim 1, wherein the wearable device is configured to determine a user inactive status, transmit the inactive status to the base telephone and initiate at least one health measurement.

10. The system of claim 1, wherein the wearable device is configured to determine a user fall status and transmit the fall status to the base telephone.

11. The system of claim 1, wherein the wearable device is configured to determine a health condition associated with the user and transmit the health condition to the base telephone.

12. The system of claim 1, wherein the base telephone is configured to recognize a scheduled calendar event, display information related to the scheduled calendar event, and transmit a calendar event notification to the wearable device for notification to the user.

13. The system of claim 12, wherein the base telephone is configured to communicate with a plurality of wearable devices each associated with a unique identifier.

14. The system of claim 1, wherein the wearable device is configured to initiate at least one health measurement and if a measured value of the at least one health measurement is outside of a predetermined range, transmit an alert to a remote monitor.

15. The system of claim 14, wherein the at least one health measurement is a pulse measurement.

16. The system of claim 14, wherein the at least one health measurement is a blood pressure measurement.

17. The system of claim 14, wherein the at least one health measurement is a blood oxygen saturation measurement.

18. The system of claim 14, wherein the at least one health measurement is a breathing rate measurement.

19. The system of claim 14, wherein the at least one health measurement is a temperature measurement.

20. A personal safety response system, comprising:
a wearable device to be worn by a user, the wearable device including:
at least one of a speaker, visual indicator, and vibrator configured for generating audio, visual, and haptic notification;
a panic button;
an antenna;
a radio frequency transceiver; and
a controller configured to recognize a first set of predetermined conditions, and transmit a first notification to a mobile telephone having a memory encoded with a specialized personal safety response executable set of software instructions;
the mobile telephone being configured to:
perform two-way communication with the wearable device;
transmit and receive data over a telecommunication network and Internet;
recognize a second set of predetermined conditions, and transmit at least one of a second notification to the wearable device and a third notification to a remote monitor;
receive user input; and
display information associated with the second notification transmitted to the wearable device;
wherein the radio frequency transceiver of the wearable device initially transmits the first notification to the mobile telephone in a low power mode to conserve power usage, decreases power from the low power mode until bit errors and lost data packets occur, and then increases power until the transmitted first notification is received by the mobile telephone with minimal errors.

21. The system of claim 20, wherein the mobile telephone is further configured to audibly announce the second notification and associated information.

22. The system of claim 20, wherein the controller of the wearable device is configured to determine when the wearable device and the mobile telephone are separated by a distance near a predetermined limit, and to generate an audio/visual/haptic notification to alert the user.

23. The system of claim 20, wherein the wearable device is configured to perform an operational status check and transmit the operational status to the mobile telephone.

24. The system of claim 20, wherein the wearable device is configured to determine a battery low status and transmit the battery low status to the mobile telephone.

25. The system of claim 20, wherein the mobile telephone is configured to determine a battery low status and transmit the battery low status to the wearable device for notification to the user.

26. The system of claim 20, wherein the wearable device is configured to recognize the panic button being activated and to generate and transmit an emergency state notification to the mobile telephone; and
the mobile telephone is configured to transmit an emergency state notification to the remote monitor.

27. The system of claim 20, wherein the wearable device is configured to determine a user inactive status and transmit the inactive status to the mobile telephone and initiate at least one health measurement.

28. The system of claim 20, wherein the wearable device is configured to determine a user fall status and transmit the fall status to the mobile telephone.

29. The system of claim 20, wherein the wearable device is configured to determine a health condition associated with the user and transmit the health condition to the mobile telephone.

30. The system of claim 20, wherein the mobile telephone is configured to recognize a scheduled calendar event, display information related to the scheduled calendar event, and transmit a calendar event notification to the wearable device for notification to the user.

31. A personal safety response method encoded as instructions stored in a memory device of a mobile telephone, comprising:
performing two-way communication with a wearable device, and transmitting and receiving data over a telecommunication network and Internet;
recognizing one of a first set of predetermined conditions including low battery, incoming text message, incoming call, and calendar event;
transmitting a first notification to the wearable device and optionally transmitting a second notification to a remote monitor;
displaying information associated with the recognized predetermined condition;
receiving a third notification from the wearable device concerning one of a second set of predetermined conditions associated with the user, including low battery, panic button pushed, fall, inactivity, and health status;
displaying information associated with the predetermined condition notified by the wearable device; and
transmitting a fourth notification to the remote monitor;

wherein the transmitting steps include transmitting notifications initially in a low power mode to conserve power usage, decreasing power from the low power mode until bit errors and lost data packets occur, and then increasing power until the transmitted notification is received by the wearable device with minimal errors.

32. The method of claim 31, further comprising modulating data transmission power to determine when the wearable device and the mobile telephone are separated by a distance near a predetermined limit, and to generate an audio/visual/haptic notification to alert the user.

33. The method of claim 32, further comprising receiving an operational status report from the wearable device.

34. The method of claim 31, further comprising:
receiving an incoming text message;
sending a notification to the wearable device;
displaying the text message;
and activating a text-to-speech function in response to a user input.

35. The method of claim 31, further comprising performing two-way communication with a plurality of wearable devices each associated with a unique identifier.

36. The method of claim 31, further comprising audibly announcing the third notification and associated information.

* * * * *